(12) United States Patent  
Lowney (10) Patent No.: US 12,228,735 B2
(45) Date of Patent: Feb. 18, 2025

(54) TRICOLOR WAVEGUIDE EXIT PUPIL EXPANSION SYSTEM WITH OPTICAL POWER

(71) Applicant: GOOGLE LLC, Mountain View, CA (US)

(72) Inventor: Joseph Daniel Lowney, Tucson, AZ (US)

(73) Assignee: GOOGLE LLC, Mountain View, CA (US)

( * ) Notice: Subject to any disclaimer, the term of this patent is extended or adjusted under 35 U.S.C. 154(b) by 157 days.

(21) Appl. No.: 17/729,167

(22) Filed: Apr. 26, 2022

(65) Prior Publication Data

US 2023/0194870 A1 Jun. 22, 2023

Related U.S. Application Data

(60) Provisional application No. 63/290,083, filed on Dec. 16, 2021.

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0038* (2013.01); *G02B 2027/011* (2013.01); *G02B 2027/0112* (2013.01); *G02B 2027/0116* (2013.01); (Continued)

(58) Field of Classification Search
CPC ........................... G02B 6/0016; G02B 6/0038; G02B 27/0172; G02B 2027/011; G02B 2027/0112; G02B 2027/0123; G02B 2027/0178

See application file for complete search history.

(56) References Cited

U.S. PATENT DOCUMENTS 9,989,764 B2 * 6/2018 Alexander ........... G02B 27/017
10,073,267 B2 9/2018 Tekolste et al.
10,802,190 B2 10/2020 Alexander et al.
(Continued)

FOREIGN PATENT DOCUMENTS

CN 112465724 A 3/2021

OTHER PUBLICATIONS

Urey, "Diffractive Exit-Pupil Expander for Display Applications" https://www.researchgate.net/publication/5487301_Diffractive_Exit-Pupil_Expander_for_Display_Applications, Applied Optics, vol. 40, No. 32, Nov. 10, 2001, 12 pages.

(Continued)

*Primary Examiner* — Daniel Petkovsek (57) ABSTRACT

A system for displaying a virtual image to a user includes a light engine to generate a display light representing the virtual image, a diffractive waveguide, and an incoupler and outcoupler that are each optically coupled to the diffractive waveguide. In operation, the incoupler receives the display light from the light engine and directs the received display light to the diffractive waveguide, and the outcoupler directs at least a portion of the display light from the diffractive waveguide to an eye of the user. The diffractive waveguide is configured to converge a first component light of the generated display light at a first focal distance from the eye of the user, and to converge one or more additional component lights of the generated display light at one or more distinct other focal distances from the eye of the user.

14 Claims, 8 Drawing Sheets

(52) U.S. Cl.
CPC ............... *G02B 2027/0123* (2013.01); *G02B 2027/0178* (2013.01)

(56) References Cited

U.S. PATENT DOCUMENTS

| | | | |
|---|---|---|---|
| 2009/0128666 | A1 | 5/2009 | Rappaport et al. |
| 2011/0261178 | A1 | 10/2011 | Lo et al. |
| 2016/0238845 | A1* | 8/2016 | Alexander ......... G02B 27/0081 |
| 2019/0287495 | A1 | 9/2019 | Mathur et al. |
| 2020/0257120 | A1 | 8/2020 | Genier et al. |
| 2021/0037219 | A1 | 2/2021 | Colburn et al. |
| 2021/0208407 | A1* | 7/2021 | Eash .................. G02B 27/0101 |
| 2022/0269076 | A1* | 8/2022 | Yang .................... G02B 6/0016 |
| 2022/0334289 | A1* | 10/2022 | Zhang ...................... C08K 9/04 |
| 2022/0390666 | A1* | 12/2022 | Pietilae .................. G02B 27/00 |
| 2023/0194871 | A1* | 6/2023 | Lowney ............. G02B 27/0172 359/630 |

OTHER PUBLICATIONS

Kress, et al. "Waveguide Combiners for Mixed Reality Headsets: A Nanophotonics Design Perspective", https://doi.org/10.1515/nanoph-2020-0410, Nanophotonics 2021, vol. 10, No. 1, 34 pages.
International Search Report and Written Opinion mailed Apr. 19, 2023 for PCT/US2022/053105, 17 pages.
International Search Report and Written Opinion mailed Apr. 21, 2023 for PCT/US2022/053038, 16 pages.
Itoh, Yuta et al: "Gaussian Light Field: Estimation of Viewpoint-Dependent Blur for Optical See-Through Head-Mounted Displays", IEEE Transactions on Visualization and Computer Graphics, IEEE, USA, vol. 22, No. 11, Nov. 1, 2016 (Nov. 1, 2016), 9 pages.
International Preliminary Report on Patentability mailed Jun. 27, 2024 for PCT/US2022/053038, 9 pages.
International Preliminary Report on Patentability mailed Jun. 27, 2024 for PCT/US2022/053105, 10 pages.
Non-Final Office Action mailed Nov. 6, 2024 for U.S. Appl. No. 17/729,169, 32 pages.

* cited by examiner

TRICOLOR WAVEGUIDE EXIT PUPIL EXPANSION SYSTEM WITH OPTICAL POWER

BACKGROUND

The present disclosure relates generally to augmented reality (AR) eyewear, which fuses a view of the real world with a heads up display overlay. Wearable heads-up displays (WHUDs) are wearable electronic devices that use optical combiners to combine real world and virtual images. The optical combiner may be integrated with one or more lenses to provide a combiner lens that may be fitted into a support frame of a WHUD. In operation, the combiner lens provides a virtual display that is viewable by a user when the WHUD is worn on the head of the user. One class of optical combiner uses a waveguide (also termed a lightguide) to transfer light. In general, light from a projector of the WHUD enters the waveguide of the combiner through an in-coupler, propagates along the waveguide via total internal reflection (TIR), and exits the waveguide through an out-coupler. If the pupil of the eye is aligned with one or more exit pupils provided by the outcoupler, at least a portion of the light exiting through the out-coupler will enter the pupil of the eye, thereby enabling the user to see a virtual image. Since the combiner lens is transparent, the user will also be able to see the real world.

BRIEF SUMMARY OF EMBODIMENTS

Embodiments are described herein in which a virtual image is displayed to a user via a light engine to generate a display light representing the virtual image, a diffractive waveguide, and an incoupler and outcoupler that are each optically coupled to the diffractive waveguide. In operation, the incoupler receives the display light from the light engine and directs the received display light to the diffractive waveguide, and the outcoupler directs at least a portion of the display light from the diffractive waveguide to an eye of the user. The diffractive waveguide is configured to converge a first component light of the generated display light at a first focal distance from the eye of the user, and to converge one or more additional component lights of the generated display light at one or more distinct other focal distances from the eye of the user.

In certain embodiments, a system for displaying a virtual image to a user may include a light engine to generate a display light representing the virtual image; a diffractive waveguide; an incoupler optically coupled to the diffractive waveguide, the incoupler to receive the display light from the light engine and to direct the received display light to the diffractive waveguide; and an outcoupler optically coupled to the diffractive waveguide, the outcoupler to direct at least a portion of the display light from the diffractive waveguide to an eye of the user. The diffractive waveguide may be configured to converge a first component light of the generated display light at a first focal distance from the eye of the user, and to converge one or more additional component lights of the generated display light at one or more distinct other focal distances from the eye of the user.

The first component light of the generated display light may include a green component light, and wherein the one or more additional component lights may include at least one of a group that includes a red component light of the generated display light or a blue component light of the generated display light.

The first component light of the generated display light may include a component light having a wavelength of between 495 nm and 570 nm.

The outcoupler may include a surface grating that includes a plurality of etched channels, such that the plurality of etched channels provide an optical power to converge the first component light of the generated display light at the first focal distance. Configuration of the plurality of etched channels to provide the optical power may include configuration of one or more physical parameters of the surface grating, such that the one or more physical parameters comprises at least one of a group that includes an angle of the etched channels with respect to the surface grating, a depth of the etched channels, or a lateral spacing of the etched channels.

The system may further include one or more processors communicatively coupled to the light engine, and a memory storing instructions that, when executed by the one or more processors, cause the one or more processors to modify the virtual image prior to the light engine generating the display light. To converge at least one additional component light of the one or more additional component lights may include to converge the at least one additional component light at a distinct second focal distance from the eye of the user, such that to modify the virtual image includes to modify one or more aspects of the virtual image in order to compensate for a distortion perceived by the user of the at least one additional component light. The perceived distortion may be based at least in part on convergence of the at least one additional component light at the distinct second focal distance.

The diffractive waveguide may be a first diffractive waveguide that corresponds to a convergence of the first component light at the first focal distance from the eye of the user, and the system may further include one or more additional diffractive waveguides that each correspond to a convergence of the first component light at an additional distinct focal distance from the eye of the user.

In certain embodiments, the system may be incorporated by a wearable heads-up display (WHUD).

In certain embodiments, a method for displaying a virtual image to a user may include generating, by a light engine, a display light representing the virtual image; receiving the display light from the light engine and directing the received display light to a diffractive waveguide; and directing at least a portion of the display light from the diffractive waveguide to an eye of the user via an outcoupler. The directing may include converging a first component light of the generated display light at a first focal distance from the eye of the user, and converging one or more additional component lights of the generated display light at one or more distinct other focal distances from the eye of the user.

The first component light of the generated display light may include a first color component light, such that the one or more additional component lights includes at least one of a group that may comprise a second color component light of the generated display light or a third color component light of the generated display light. The first color component light of the generated display light may include a green component light having a wavelength of between 495 nm and 570 nm.

The method may further include providing an optical power via a surface grating of the outcoupler to converge the first component light of the generated display light at the first focal distance. Providing the optical power may include configuring one or more physical parameters of the surface grating, the one or more physical parameters including at least one of a group that may include an angle of the etched channels with respect to the surface grating, a depth of the etched channels, and a lateral spacing of the etched channels.

The method of claim 11 may further include modifying the virtual image prior to generating the display light. Converging at least one additional component light of the one or more additional component lights may include converging the at least one additional component light at a distinct second focal distance from the eye of the user, such that modifying the virtual image may include modifying one or more aspects of the virtual image in order to compensate for a distortion perceived by the user of the at least one additional component light. The perceived distortion may be based at least in part on convergence of the at least one additional component light at the distinct second focal distance.

The method may further include using one or more additional diffractive waveguides to converge the first component light at an additional distinct focal distance from the eye of the user.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items. It will be appreciated that unless specifically indicated, aspects of the accompanying drawings are not presented to scale and are not to be assumed to be so presented.

DETAILED DESCRIPTION

At least in part because diffractive waveguide architecture typically relies on light entering and exiting the waveguide being collimated, a WHUD using such waveguides is typically designed to display an image that appears to a user's eye to exist at an infinite distance from the user (as opposed to real world objects located closer to the user), such as how stars appear when viewing the night sky. Although this is a relaxed position for the eye, the infinite distance presents a problem when trying to overlay a virtual image upon the user's perceived image of the surrounding real world, as the eye attempts to simultaneously focus on and interpret real world objects being perceived at a finite distance and the virtual image being presented at an infinite distance.

Previous attempts to remedy this issue involve placing a physical lens with positive optical power between the eye and the waveguide, thereby causing the image to display at a finite distance, typically around two meters. (As used herein, optical power refers to a degree to which a lens, mirror, or other optical system converges or diverges light.) However, in order for the perceived image of the real world to be unaffected by the corresponding distortion, an additional compensating physical lens (with an equal but opposite optical power as the first lens) may be placed on the opposite side of the waveguide. While the resulting architecture typically succeeds in "distance shifting" the virtual display, it utilizes correspondingly larger and heavier components, which is typically disfavored for WHUD and other wearable devices.

Alternatively, optical power may be directly applied via a waveguide exit pupil expander's diffractive outcoupler. In certain scenarios and embodiments, such optical power may be applied to the outcoupling grating by introducing a slight curvature to an otherwise linear diffraction grating. However, due to the manner in which the grating interacts with and affects light exiting the outcoupler, the resulting optical power does not equally affect light of different wavelengths. In particular, because the curvature of such an outcoupler grating disparately affects the angle at which the individual red, green, and blue (RGB) components of a displayed virtual image exit the outcoupler, those components will be perceived by an eye of the user as occurring at different focal distances unless the incorporating device includes multiple distinct waveguides (e.g., one or more for each of the red, green, and blue spectra). As with approaches that utilize multiple physical lenses to accomplish the desired distance shift of the virtual display, incorporating multiple distinct waveguides generally corresponds to larger and heavier devices, which as noted is disfavored for wearable devices.

Embodiments of techniques presented herein provide optical power (such as for distance shift or other purposes) via an outcoupler grating of only a single waveguide. In certain embodiments, parameters of such an outcoupler grating may be selected in order to tune a focal distance of a full-color virtual image (one with red, green, and blue components) specifically for the peak of human photopic response, which is typically centered around green light having a wavelength of approximately 555 nm—the wavelength of light that the human visual system predominantly uses to perceive detail in an image. From a radiometric standpoint, the red and blue light components of a virtual image provided via a single waveguide tuned in this manner may appear defocused or blurry. However, when considering the full human visual system (including the cognitive image processing of the brain), in many circumstances the image will appear sharp because the human visual system relies predominantly upon green light to determine sharpness and resolve detail. Thus, in this manner, optical power may be applied to the outcoupling region of a single-waveguide exit pupil expansion system while retaining a high degree of visual acuity for the user perceiving a resultant virtual image.

Figure 1:
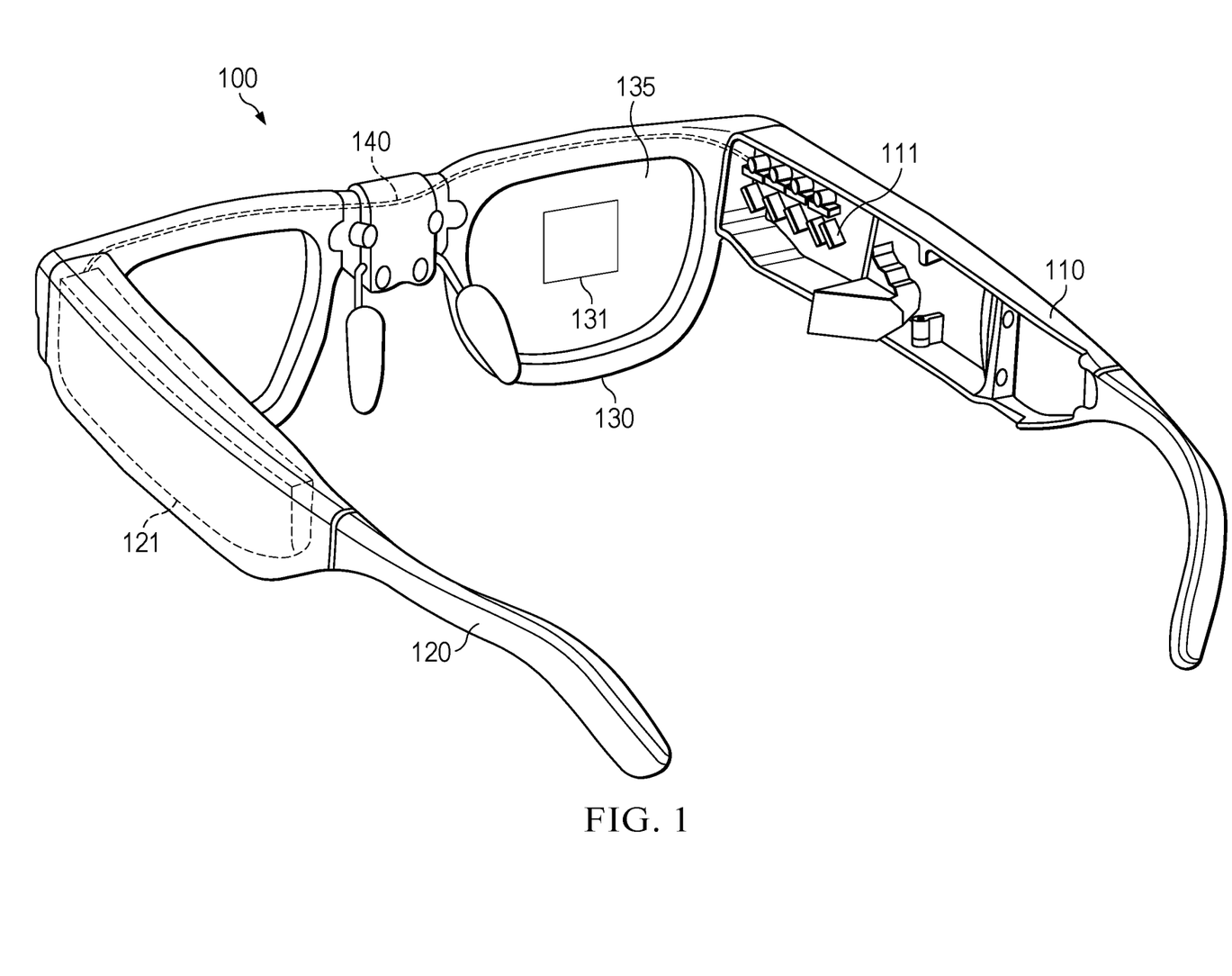
FIG. 1 illustrates an example wearable display device in accordance with some embodiments.

FIG. 1 illustrates an example wearable display device 100 in accordance with various embodiments. The wearable display device 100 includes a support structure which includes a first arm 110, a second arm 120, and a front frame 130, which is physically coupled to the first arm 110 and the second arm 120. When worn by a user, the first arm 110 may be positioned on a first side of a head of the user, while the second arm 120 may be positioned on a second side of the head of the user opposite to the first side of the head of the user, and the front frame 130 may be positioned on a front side of the head of the user. The first arm 110 carries a light engine 111 which outputs light representative of augmented reality (AR) content to be viewed by a user. The first arm 110 may also optionally carry several additional components of the wearable display device 100, such as a processor, a non-transitory processor-readable storage medium, or a power supply circuit, among other examples. The front frame 130 carries a lens structure 135 with display optics 131 (including a diffractive waveguide, not shown) in a field-of-view of the user to receive light output from the light engine 111 and redirect this light to form AR content to be viewed by the user in conjunction with a view of the real world the physical world viewed by the user and which physically exists beyond the display assembly.

In the example of FIG. 1, the display may be a monocular display visible to a right eye of the user. The second arm 120 as shown in FIG. 1 carries a power source 121, which powers the components of the wearable display device 100. The front frame 130 carries a set of electrically conductive current paths 140, which provide electrical coupling between the power source 121 and the light engine 111, and any other electrical components carried by the first arm 110. The term power source as used herein can refer to a component which provides electrical power, which may include a source of stored power such as a battery (e.g., a chemical battery, a mechanical battery), or a power generation system, such as piezoelectric elements, solar cells, or similar. A set of electrically conductive current paths as used herein can refer to a single electrically conductive current path, such as a wire or conductive trace on a printed circuit board, as well as a plurality of electrically conductive current paths, such as a plurality of wires or a plurality of conductive traces on a printed circuit board.

In various embodiments, aspects of the example wearable display device may be modified from the depicted example in various ways. For example, in certain embodiments the orientation of the wearable display device 100 may be reversed, such that the display is presented to a left eye of a user instead of the right eye. The second arm 120 could carry a light engine similar to the light engine 111 carried by the first arm 110, and the front frame 130 could also carry another lens structure similar to the lens structure 135, such that wearable display device 100 presents a binocular display to both a right eye and a left eye of a user.

The light engine 111 and the display optics 131 can include any appropriate display architecture for outputting light and redirecting the light to form a display to be viewed by a user. For example, the light engine 111 and any of the light engines discussed herein may include one or more instances of components selected from a group that includes at least: one of a projector, a scanning laser projector, a micro-display, a white-light source, or any other display technology as appropriate for a given application. The display optics 131 may include one or more instances of optical components selected from a group that includes at least: a waveguide (references to which, as used herein, include and encompass both light guides and waveguides), a holographic optical element, a prism, a diffraction grating, a light reflector, a light reflector array, a light refractor, a light refractor array, or any other light-redirection technology as appropriate for a given application, positioned and oriented to redirect the AR content from the light engine 111 towards the eye of the user.

The lens structure 135 may include multiple lens layers, each of which may be disposed closer to an eye of the user than the display optics 131 (eye side) or further from the eye of the user than the display optics 131 (world side). A lens layer can for example be molded or cast, may include a thin film or coating, and may include one or more transparent carriers. A transparent carrier as described herein may refer to a material which acts to carry or support an optical redirector. As one example, a transparent carrier may be an eyeglasses lens or lens assembly. In addition, in certain embodiments one or more of the lens layers may be implemented as a contact lens.

Non-limiting example display architectures could include scanning laser projector and holographic optical element combinations, side-illuminated optical light guide displays, pin-light displays, or any other wearable heads-up display technology as appropriate for a given application. Various example display architectures are described in at least U.S. Provisional Patent Application No. 62/754,339, U.S. Provisional Patent Application Ser. No. 62/782,918, U.S. Provisional Patent Application Ser. No. 62/789,908, U.S. Provisional Patent Application Ser. No. 62/845,956, and U.S. Provisional Patent Application Ser. No. 62/791,514. The term light engine as used herein is not limited to referring to a singular light source, but can also refer to a plurality of light sources, and can also refer to a light engine assembly. A light engine assembly may include some components which enable the light engine to function, or which improve operation of the light engine. As one example, a light engine may include a light source, such as a laser or a plurality of lasers. The light engine assembly may additionally include electrical components, such as driver circuitry to power the at least one light source. The light engine assembly may additionally include optical components, such as collimation lenses, a beam combiner, or beam shaping optics. The light engine assembly may additionally include beam redirection optics, such as least one MEMS mirror, which can be operated to scan light from at least one laser light source, such as in a scanning laser projector. In the above example, the light engine assembly includes a light source and also components, which take the output from at least one light source and produce conditioned display light to convey AR content. All of the components in the light engine assembly may be included in a housing of the light engine assembly, affixed to a substrate of the light engine assembly, such as a printed circuit board or similar, or separately mounted components of a wearable heads-up display (WHUD). Certain light engine assemblies are discussed in U.S. Provisional Patent Application No. 62/916,297.

Figure 2:
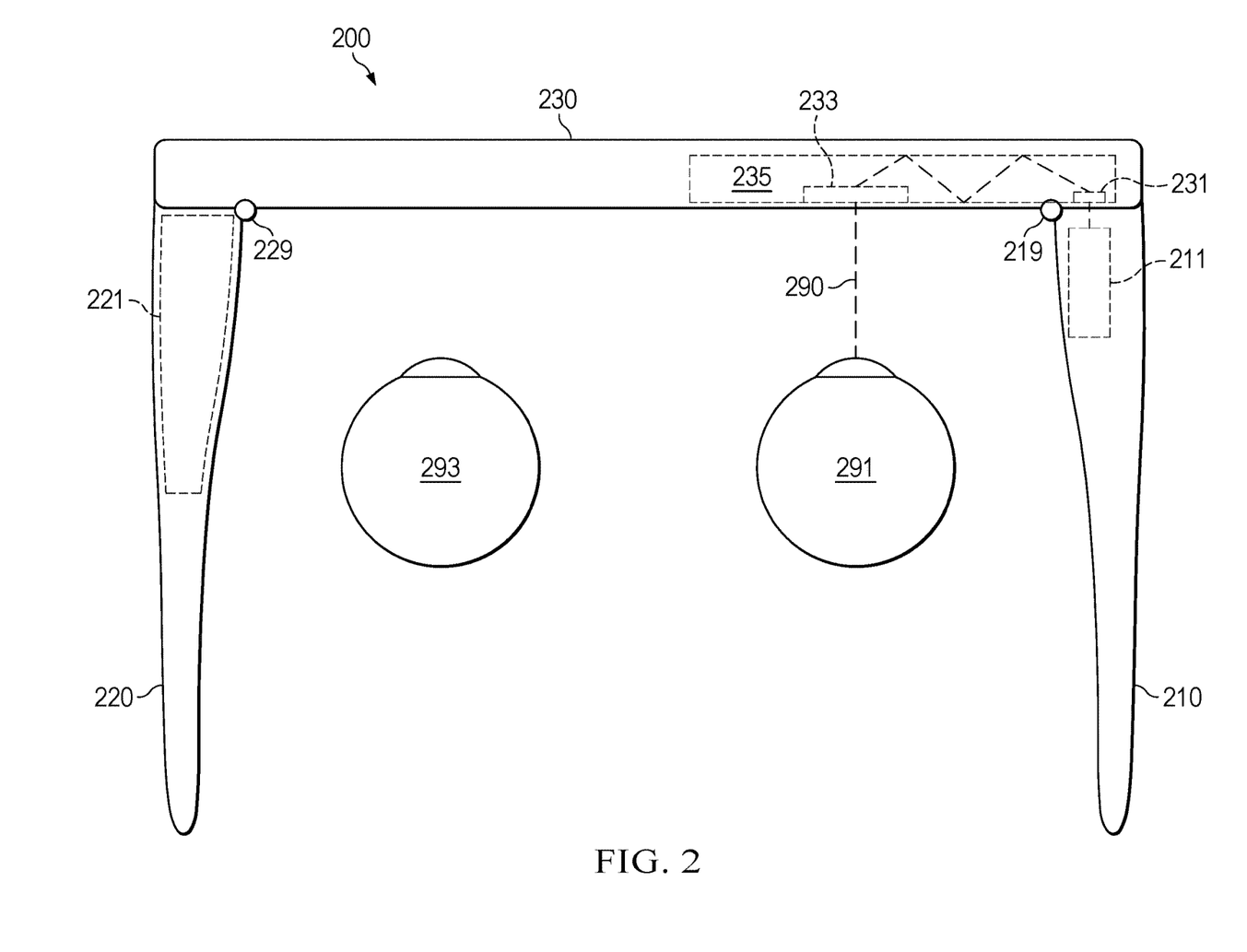
FIG. 2 illustrates a diagram of a wearable display device in accordance with some embodiments.

FIG. 2 illustrates a diagram of a wearable display device 200 in accordance with some embodiments. In some embodiments, the wearable display device 200 may implement or be implemented by aspects of the wearable display device 100. For example, the wearable display device 200 may include a first arm 210, a second arm 220, and a front frame 230. The first arm 210 may be coupled to the front frame 230 by a hinge 219, which allows the first arm 210 to rotate relative to the front frame 230. The second arm 220 may be coupled to the front frame 230 by the hinge 229, which allows the second arm 220 to rotate relative to the front frame 230.

In the example of FIG. 2, the wearable display device 200 may be in an unfolded configuration, in which the first arm 210 and the second arm 220 are rotated such that the wearable display device 200 can be worn on a head of a user, with the first arm 210 positioned on a first side of the head of the user, the second arm 220 positioned on a second side of the head of the user opposite the first side, and the front frame 230 positioned on a front of the head of the user. The first arm 210 and the second arm 220 can be rotated towards the front frame 230, until both the first arm 210 and the second arm 220 are approximately parallel to the front frame 230, such that the wearable display device 200 may be in a compact shape that fits conveniently in a rectangular, cylindrical, or oblong case. Alternatively, the first arm 210 and the second arm 220 may be fixedly mounted to the front frame 230, such that the wearable display device 200 cannot be folded.

In FIG. 2, the first arm 210 carries a light engine 211. The second arm 220 carries a power source 221. The front frame 230 carries a diffractive waveguide 235 including an incoupling optical redirector (incoupler) 231, an outcoupling optical redirector (outcoupler) 233, and at least one set of electrically conductive current paths, which provide electrical coupling between the power source 221 and electrical components (such as the light engine 211) carried by the first arm 210. Such electrical coupling could be provided indirectly, such as through a power supply circuit, or could be provided directly from the power source 221 to each electrical component in the first arm 210. As used herein, the terms carry, carries or similar do not necessarily dictate that one component physically supports another component. For example, it is stated above that the first arm 210 carries the light engine 211. This could mean that the light engine 211 is mounted to or within the first arm 210, such that the first arm 210 physically supports the light engine 211. However, it could also describe a direct or indirect coupling relationship, even when the first arm 210 is not necessarily physically supporting the light engine 211.

The light engine 211 can output a display light 290 (simplified for this example) representative of AR content or other display content to be viewed by a user. The display light 290 can be redirected by diffractive waveguide 235 towards an eye 291 of the user, such that the user can see the AR content. The display light 290 from the light engine 211 impinges on the incoupler 231 and is redirected to travel in a volume of the diffractive waveguide 235, where the display light 290 is guided through the light guide, such as by total internal reflection (TIR) or surface treatments such as holograms or reflective coatings. Subsequently, the display light 290 traveling in the volume of the diffractive waveguide 235 impinges on the outcoupler 233, which redirects the display light 290 out of the light guide redirector and towards the eye 291 of a user. Example WHUD display architectures are described in at least U.S. Provisional Patent Application No. 62/754,339, U.S. Provisional Patent Application Ser. No. 62/782,918, U.S. Provisional Patent Application Ser. No. 62/789,908, U.S. Provisional Patent Application Ser. No. 62/845,956, and U.S. Provisional Patent Application Ser. No. 62/791,514.

The wearable display device 200 may include a processor (not shown) that is communicatively coupled to each of the electrical components in the wearable display device 200, including but not limited to the light engine 211. The processor can be any suitable component which can execute instructions or logic, including but not limited to a microcontroller, microprocessor, multi-core processor, integrated-circuit, ASIC, FPGA, programmable logic device, or any appropriate combination of these components. The wearable display device 200 can include a non-transitory processor-readable storage medium, which may store processor readable instructions thereon, which when executed by the processor can cause the processor to execute any number of functions, including causing the light engine 211 to output the light 290 representative of display content to be viewed by a user, receiving user input, managing user interfaces, generating display content to be presented to a user, receiving and managing data from any sensors carried by the wearable display device 200, receiving and processing external data and messages, and any other functions as appropriate for a given application. The non-transitory processor-readable storage medium can be any suitable component, which can store instructions, logic, or programs, including but not limited to non-volatile or volatile memory, read only memory (ROM), random access memory (RAM), FLASH memory, registers, magnetic hard disk, optical disk, or any combination of these components.

As noted elsewhere herein, additional waveguides may be associated with a generally undesirable increase in mass, size, and manufacturing complexity associated with an including WHUD device. However, in certain embodiments it may be useful to include multiple waveguides tuned in the manner described above with respect to green light components of a virtual image. For example, the WHUD device 200 may in certain embodiments include a single distinct waveguide for each of multiple focal planes desired to be viewed by a user of the WHUD device, such as to provide a first virtual image at a first focal distance from a user, and a second virtual image at a distinct second focal distance from the user. Thus, while various examples may be discussed herein with respect to a single waveguide and outcoupler grating for providing a virtual image at a single focal distance, it will be appreciated that in various embodiments multiple waveguides (and corresponding outcoupler gratings) may be utilized, such as each corresponding to a distinct focal distance.

Figure 3:
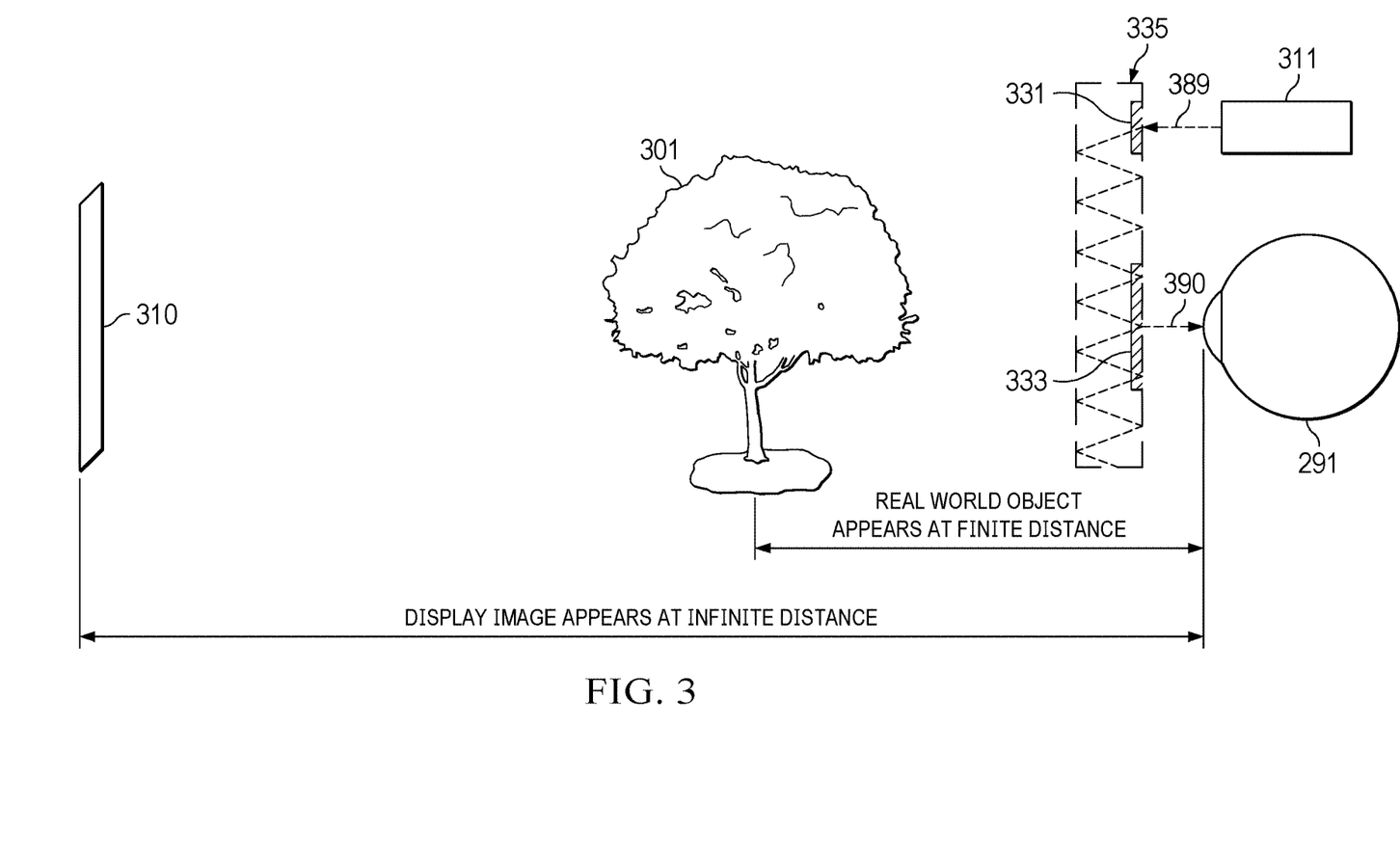
FIG. 3 illustrates a diagram of an augmented reality environment that includes multiple optical components of a wearable display device.

FIG. 3 illustrates a diagram of multiple optical components of a wearable display device in an augmented reality environment. In particular, a light engine 311 is positioned to provide incoupled display light 389 representing a virtual image 310 to a user's eye 291, which is positioned to receive outcoupled display light 390 via an incoupler 331 and an outcoupler 333 of a diffractive waveguide 335. In the depicted environment, a real world object (a tree) 301 appears at a finite distance from the user. However, in this example the diffractive waveguide 335 is a "straight" diffractive waveguide without any grating curvature to provide optical power via the outcoupler 333, and thus the virtual image 310 appears to the user to be at an infinite focal distance. This arrangement is potentially confusing for the user, as the virtual image 310 is essentially superimposed in front of the perceived tree 301, despite that tree being focally closer than the infinitely-distant virtual image.

Figure 4:
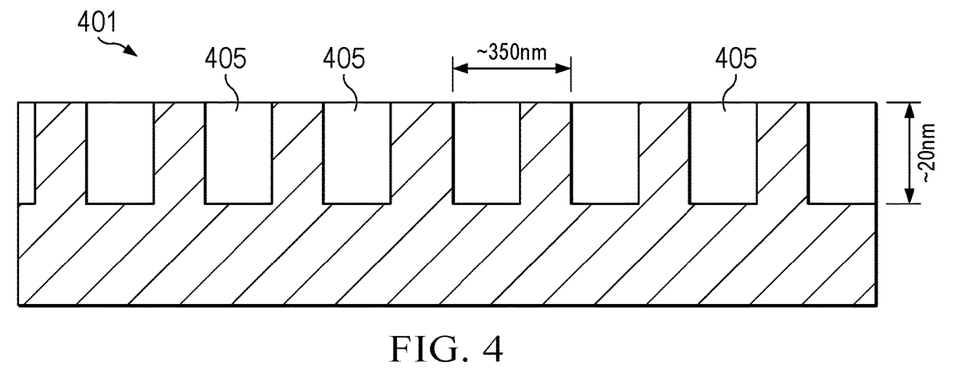
FIG. 4 depicts a partial cross-sectional view of a diffractive waveguide surface grating.

FIG. 4 depicts a partial cross-sectional view of the surface of a diffractive waveguide outcoupler grating 401. In the depicted example, the surface of the outcoupler grating 401 includes etched vertical channels 405 that are approximately 20 nm deep and spaced approximately 350 nm apart. Notably, the vertical channels 405 are substantially perpendicular to the surface of the outcoupler grating 401, indicating that the outcoupler grating 401 is a "straight" outcoupler grating which provides no optical power to affect the infinite distance at which a resulting virtual image is perceived by a user. Consequently, although the resulting focal plane of a virtual image is at an infinite distance, all of the light components of the virtual image are directed to that same focal plane.

Figure 5:
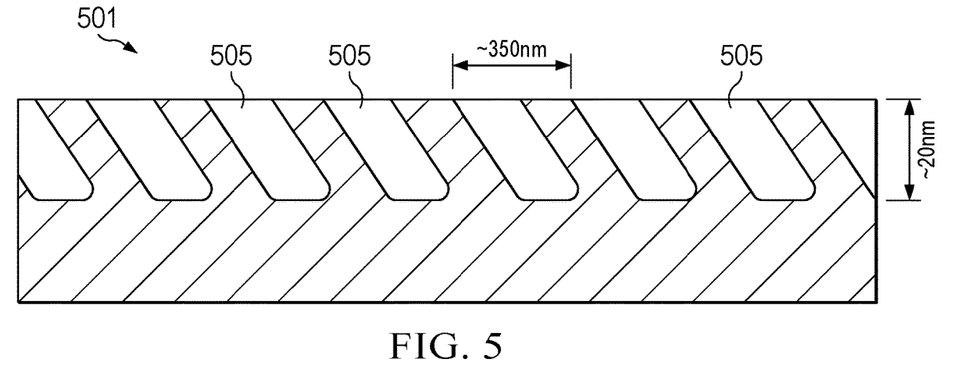
FIG. 5 depicts a partial cross-sectional view of a diffractive waveguide surface grating in accordance with some embodiments.

FIG. 5 depicts a partial cross-sectional view of the surface of a diffractive waveguide outcoupler grating 501 in accordance with one or more embodiments. In the depicted example, the surface of the outcoupler grating 501 includes etched channels 505 that are approximately 20 nm deep and spaced approximately 350 nm apart. In contrast to the example of outcoupler grating 401 of FIG. 4, the etched channels 505 of the outcoupler grating 501 are slanted and curved (sometimes termed "blazed"), providing a degree of optical power with which to affect the focal distance at which the resulting virtual image is perceived. In certain embodiments, the etched channels may also be "chirped," providing an additional aspect of optical power by varying the pitch—the lateral spacing—of the etched channels along the surface of the outcoupler grating 501.

In contrast to the outcoupler grating 401 of FIG. 4, which lacked any optical power to converge or diverge outcoupled display light, the same physical characteristics of the outcoupler grating 501 that enable such optical power also affect the angle at which the outcoupled display light exits the corresponding outcoupler differently depending on the wavelength of that incident light. Thus, the provision of this optical power means that the red, green, and blue components of the resulting virtual image will appear at different focal distances. In various embodiments, the optical power provided by the outcoupler grating 501—and resulting perceived focal distance of a resulting virtual image—may be configured via one or more physical parameters of the outcoupler grating itself. For example, the optical power may be configured by selecting one or more parameters of a set of parameters that includes a depth of the grating channels, a lateral spacing of the grating channels, and an angle of the grating channels. In various embodiments, such parameters are held substantially consistent across the entire outcoupler grating; however, in certain embodiments the physical parameters of the outcoupler grating may vary across one or more dimensions of the outcoupler grating (generally termed "chirping"), such as to gradually increase or decrease the lateral spacing of the grating channels in order to provide a non-planar perceived focal distance for the virtual image displayed via the outcoupler grating. It will be appreciated that the actual channel angle and/or curvature are depicted in an exaggerated manner; at the scale of such elements, the associated angle and/or curvature are likely imperceptible to human observers even when the depiction of the associated outcoupler grating is magnified, such as for the illustration of FIG. 5.

Figure 6:
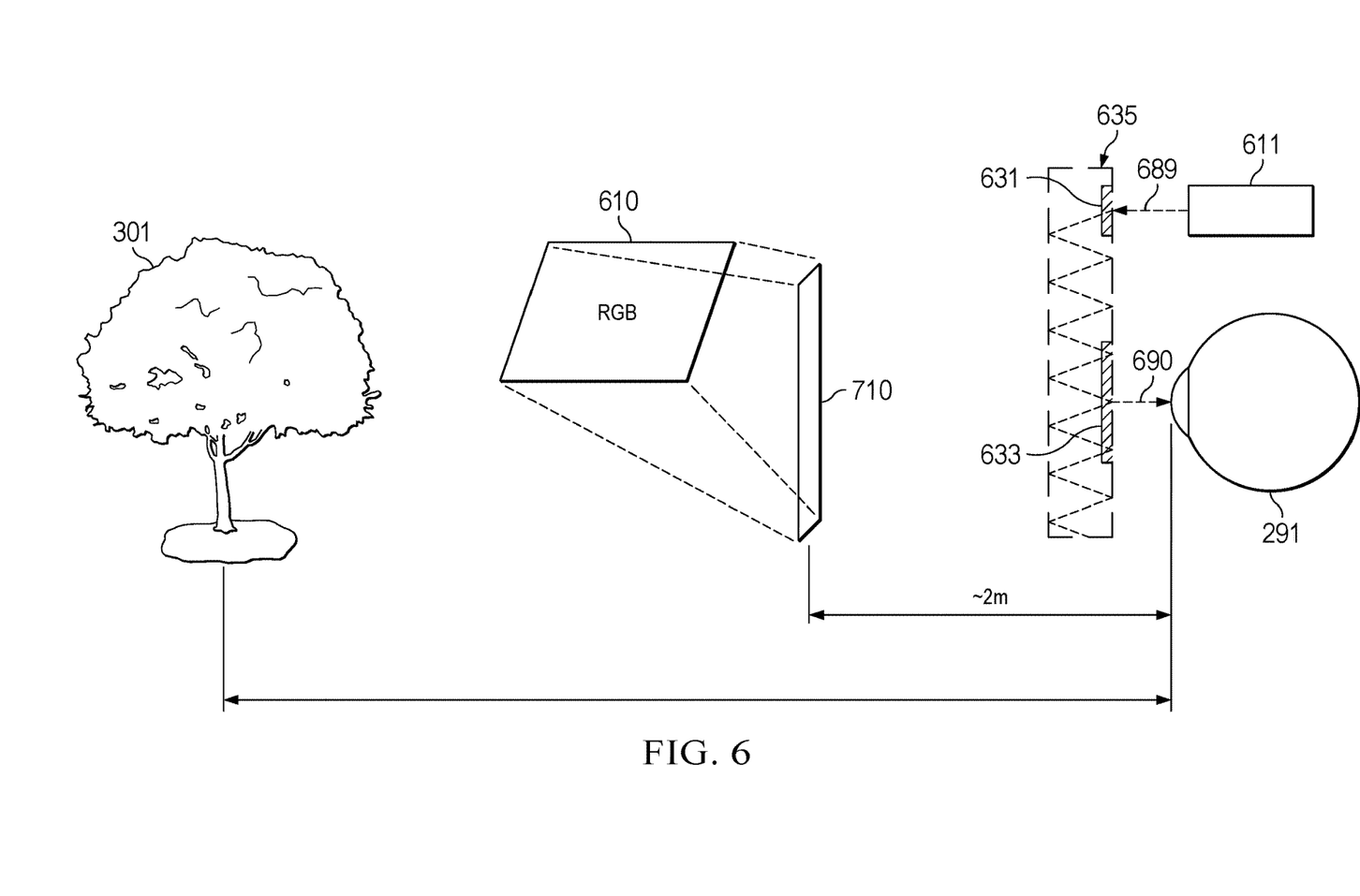
FIG. 6 illustrates a diagram of an augmented reality environment that includes multiple optical components of a wearable display device in accordance with some embodiments.

FIG. 6 illustrates a diagram of multiple optical components of a wearable display device in an augmented reality environment in accordance with some embodiments. A light engine 611 is positioned to provide incoupled display light 689 representing a virtual image 610 to a user's eye 291, which is positioned to receive outcoupled display light 690 via an incoupler 631 and an outcoupler 633 of a diffractive waveguide 635. In the depicted embodiment, the diffractive waveguide 635 provides a degree of optical power sufficient to affect a focal distance of the virtual image 610 via a surface grating of the outcoupler 633, and thus the virtual image appears to the user at a focal plane 710, which is perceived at a focal distance of approximately 2 m. Such positioning makes intuitive sense to the user, as the virtual image 610 is perceived—in line with expectations—to be closer than the tree 301 over which that virtual image is superimposed, thereby alleviating the potential user confusion described with respect to the augmented reality environment of FIG. 3.

Figure 7:
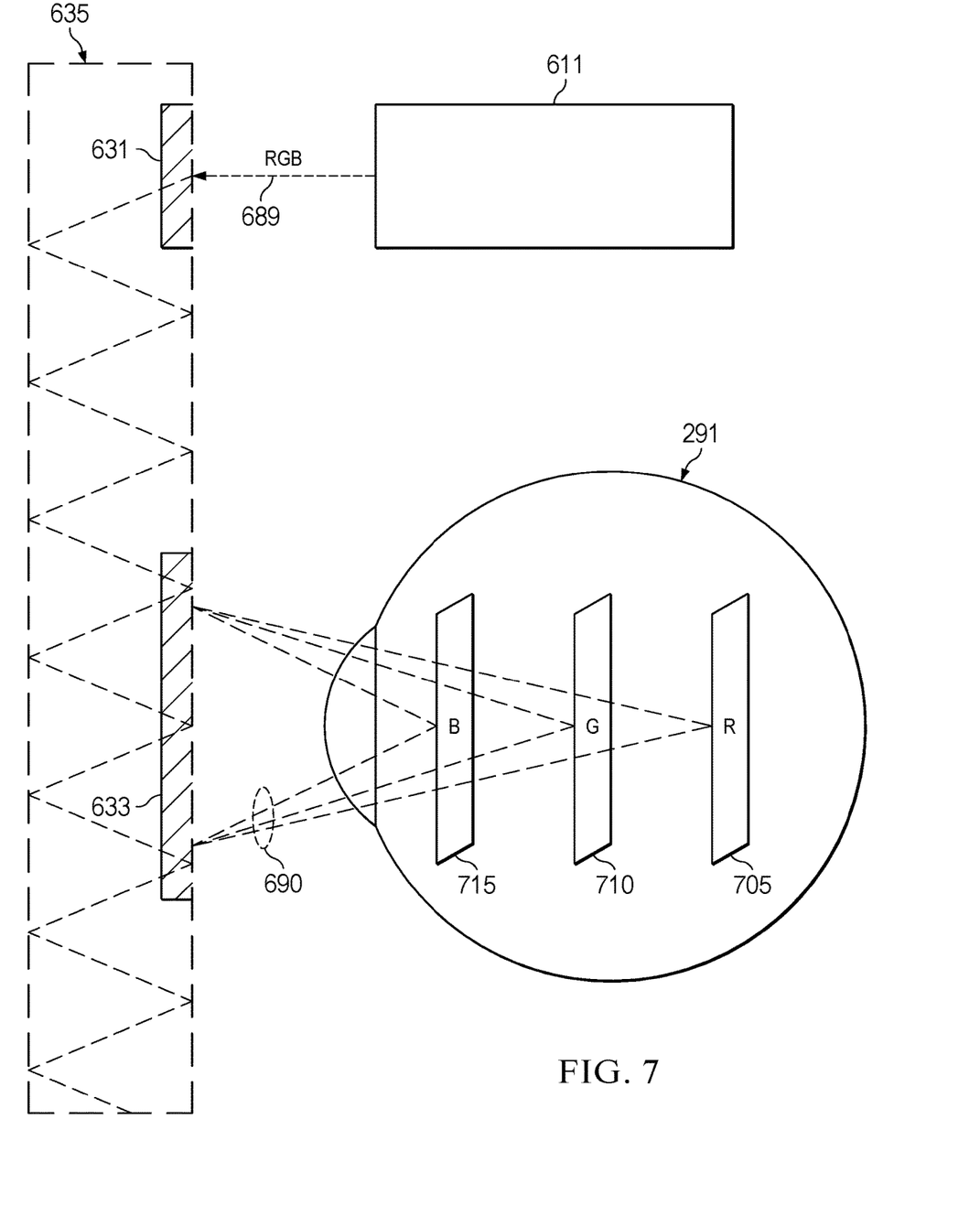
FIG. 7 illustrates aspects of a virtual image provided by optical components of a wearable display device in accordance with some embodiments.

FIG. 7 illustrates aspects of a virtual image provided by optical components of a wearable display device in accordance with some embodiments. In particular, the embodiment of FIG. 7 illustrates a disparity in focal planes associated with the respective red, green, and blue light components of a virtual image 610 presented to an eye of a user. As in the example of FIG. 6, light engine 611 provides incoupled display light 689 to user's eye 291, which receives outcoupled display light 690 via the incoupler 631 and the outcoupler 633 of diffractive waveguide 635. Outcoupler 633 includes a surface grating similar to that of outcoupler grating 501 (with reference to FIG. 5), providing a degree of optical power that focuses green components of the virtual image 610 at focal plane 710. However, that surface grating affects the angle at which incident light exits the outcoupler 633 differently depending on the wavelength of that incident light. As such, although the green light component of the virtual image 610 is focused at focal plane 710, the red light component of the virtual image 610 has a longer wavelength and is therefore focused at a different focal plane 705; similarly, the blue light component of the virtual image has a shorter wavelength and is therefore focused at a focal plane 715. Due to the wavelengths associated with the blue light components of a virtual image (which are shorter than those associated with the green light components) and to the wavelengths similarly associated with the red light components (which are longer than those associated with the green light components), the respective focal planes 705 and 715 for those components are perceived to be on either side of the green light focal plane 710—that is, the focal plane 705 for the red light components is perceived as being positioned slightly in front of the green light focal plane 710, whereas the focal plane 715 for the blue light components is perceived as being positioned slightly behind the green light focal plane 710.

Figure 8:
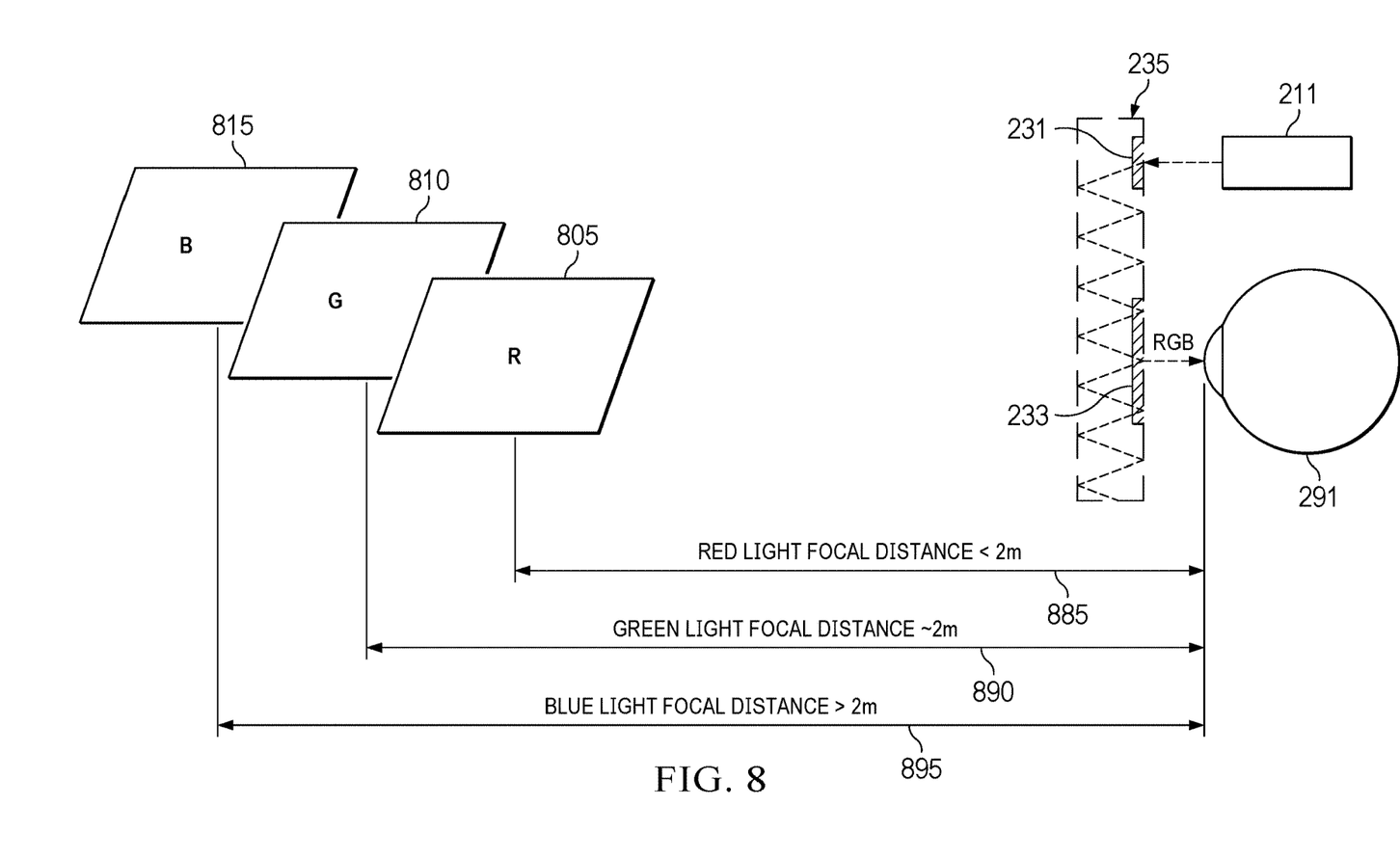
FIG. 8 illustrates aspects of a virtual image provided by optical components of a wearable display device in accordance with some embodiments.

FIG. 8 illustrates aspects of a virtual image provided by optical components of a wearable display device in accordance with some embodiments. In particular, the example of FIG. 8 further illustrates the results of providing a single waveguide and corresponding outcoupler associated with an optical power sufficient to shift a focal distance at which green light components of a virtual image are focused upon exiting the outcoupler. As seen in the depicted embodiment, the green light components 810 are in focus and perceived to exist at a focal distance 890 of approximately 2 m. However, as a result of the disparate respective focal distances of the focal planes 705 and 715 (with reference to FIG. 7) for the blue light and red light components, each of the red light components 805 (having a focal distance 885 that is less than the 2 m focal distance of the green light component) and blue light components 815 (having a focal distance 895 that is greater than the 2 m focal distance of the green light component) is perceived as blurry by the user. As depicted in the example of FIG. 8, this perceived blurring of the red light components 805 and blue light components 815 may, in certain circumstances, result in such components having a larger perceived profile and/or area than those of the sharply focused green light components 810 at the focal plane 710.

It will be appreciated that the red light components and blue light components of the virtual image 610 are not actually blurry or otherwise distorted—they are merely perceived to be blurred (out of focus) due to the photopic response of the human visual system, which relies primarily on green light to detect detail and therefore automatically focuses on the focal plane at which the green light component of that virtual image appears. Therefore, the focal distance at which the resulting virtual image is perceived typically coincides with the focal plane at which its green light component appears sharpest.

In certain embodiments, the perceived blurriness or other distortion of red light components and blue light components of a virtual image that is tuned for green light wavelengths may be mitigated or effectively eliminated using image preprocessing techniques. As a non-limiting example, a processor of an incorporating WHUD device may compensate for a larger perceived profile of one or more objects in a virtual image comprising red and blue components by modifying a size of the object(s) prior to the provision of (with reference to FIGS. 6 and 7) incoupled display light 689 to incoupler 631 by light engine 611.

Figure 9:
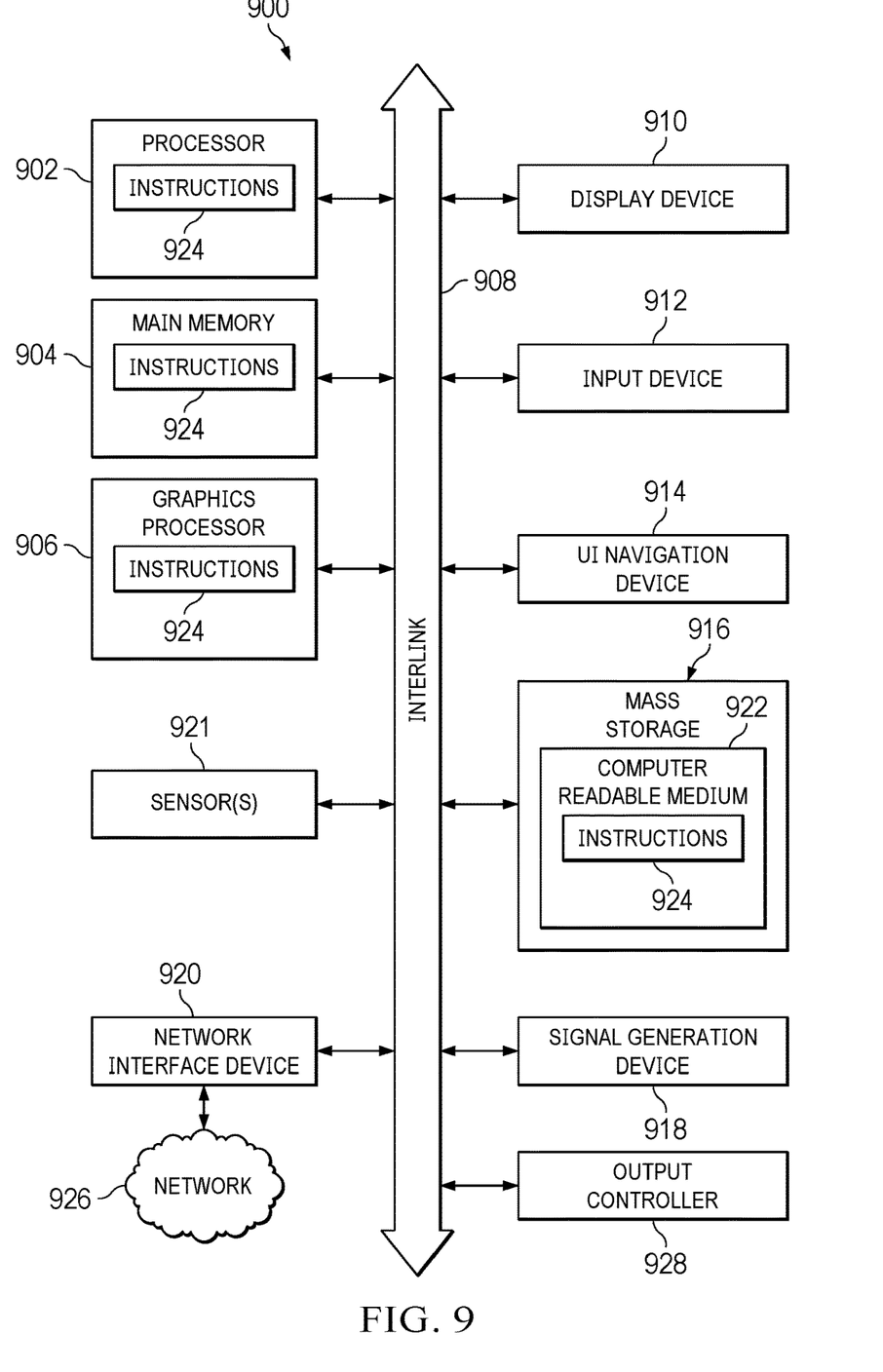
FIG. 9 is a component-level block diagram illustrating an example of a WHUD computing system suitable for implementing one or more embodiments.

FIG. 9 is a component-level block diagram illustrating an example of a WHUD computing system 900 suitable for implementing one or more embodiments. In alternative embodiments, the WHUD computing system 900 may operate as a standalone device or may be connected (e.g., networked) to other systems. In various embodiments, one or more components of the WHUD computing system 900 may be incorporated as or within one or more server computing systems to provide, as one non-limiting example, graphics rendering for display to a user via an incorporating WHUD device. It will be appreciated that an associated server computing device may include some components of WHUD computing system 900, but not necessarily all of them. In a networked deployment, the WHUD computing system 900 may operate in the capacity of a server machine, a client machine, or both in server-client network environments. In at least one example, the WHUD computing system 900 may act as a peer system in peer-to-peer (P2P) (or other distributed) network environment. The WHUD computing system 900 may therefore operate in certain embodiments as a server computer, a personal computer (PC), a tablet PC, a set-top box (STB), a mobile computing device, a web appliance, a network router, switch or bridge, or any system capable of executing instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The WHUD computing system 900 may include one or more hardware processors 902 (e.g., a central processing unit (CPU), a hardware processor core, or any combination thereof), a main memory 904, and a graphics processing unit (GPU) 906, some or all of which may communicate with each other via an interlink (e.g., bus) 908. The WHUD computing system 900 may further include a display unit 910 (such as a display monitor or other display device), an alphanumeric input device 912 (e.g., a keyboard or other physical or touch-based actuators), and a user interface (UI) navigation device 914 (e.g., a mouse or other pointing device, such as a touch-based interface). In one example, the display unit 910, input device 912, and UI navigation device 914 may include a touch screen display. The WHUD computing system 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The WHUD computing system 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a computer readable medium 922 on which is stored one or more sets of data structures or instructions 924 (e.g., software) embodying or utilized by any one or more of the techniques or functions described herein. The instructions 924 may also reside, completely or at least partially, within the main memory 904, within GPU 906, or within the hardware processor 902 during execution thereof by the WHUD computing system 900. In an example, one or any combination of the hardware processor 902, the main memory 904, the GPU 906, or the storage device 916 may constitute computer readable media.

While the computer readable medium 922 is illustrated as a single medium, the term "computer readable medium" may include a single medium or multiple media (e.g., a centralized or distributed database, and/or associated caches and servers) configured to store the one or more instructions 924.

The term "computer readable medium" may include any medium that is capable of storing, encoding, or carrying instructions for execution by the WHUD computing system 900 and that cause the WHUD computing system 900 to perform any one or more of the techniques of the present disclosure, or that is capable of storing, encoding or carrying data structures used by or associated with such instructions. Non-limiting computer readable medium examples may include solid-state memories, and optical and magnetic media. In an example, a massed computer readable medium includes a computer readable medium with a plurality of particles having invariant (e.g., rest) mass. Accordingly, massed computer readable media are not transitory propagating signals. Specific examples of massed computer readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the WHUD computing system 900, and includes digital or analog communications signals or other intangible medium to facilitate communication of such software.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system for displaying a virtual image to a user, the system comprising:
   a light engine to generate a display light representing the virtual image;
   one or more processors communicatively coupled to the light engine to modify the virtual image;
   a diffractive waveguide optically coupled to an outcoupler for directing at least a portion of the display light from the diffractive waveguide to an eye of the user;
   an incoupler optically coupled to the diffractive waveguide, the incoupler to receive the display light from the light engine and to direct the received display light to the diffractive waveguide; and
   wherein the diffractive waveguide is configured to converge a first component light of the generated display light at a first focal distance from the eye of the user, and to converge at least one additional component light of the generated display light at one or more distinct other focal distances from the eye of the user; and
   wherein to modify the virtual image includes to modify one or more aspects of the virtual image in order to compensate for a distortion that is based at least in part on convergence of the at least one additional component light at the one or more distinct other focal distances.

2. The system of claim 1, wherein the first component light of the generated display light comprises a first color component light, and wherein the at least one additional component light comprises at least one of a group that includes a second color component light of the generated display light or a third color component light of the generated display light.

3. The system of claim 2, wherein the first color component light of the generated display light comprises a green component light having a wavelength of between 495 nm and 570 nm.

4. The system of claim 1, wherein the diffractive waveguide comprises an outcoupler comprising a surface grating that includes a plurality of etched channels, and wherein the plurality of etched channels are configured to provide an optical power to converge the first component light of the generated display light at the first focal distance.

5. The system of claim 4, wherein configuration of the plurality of etched channels to provide the optical power includes configuration of one or more physical parameters of the surface grating, the one or more physical parameters including at least one of a group that includes:
   an angle of the etched channels with respect to the surface grating;
   a depth of the etched channels; and
   a lateral spacing of the etched channels.

6. The system of claim 1, wherein the diffractive waveguide is a first diffractive waveguide that corresponds to a convergence of the first component light at the first focal distance from the eye of the user, and wherein the system further comprises one or more additional diffractive waveguides that each correspond to a convergence of the first component light at an additional distinct focal distance from the eye of the user.

7. A wearable heads-up display (WHUD) comprising the system of claim 1.

8. A method for displaying a virtual image to a user, the method comprising:
   generating, by a light engine, a display light representing the virtual image;
   receiving the display light from the light engine and directing the received display light to a diffractive waveguide;
   directing at least a portion of the display light from the diffractive waveguide to an eye of the user via an outcoupler, the directing including:
      converging a first component light of the generated display light at a first focal distance from the eye of the user, and
      converging one or more additional component lights of the generated display light at one or more distinct other focal distances from the eye of the user; and
   modifying one or more aspects of the virtual image in order to compensate for a distortion based at least in part on the one or more additional component lights converging at the one or more distinct other focal distances.

9. The method of claim 8, wherein the first component light of the generated display light comprises a first color component light, and wherein the one or more additional component lights comprises at least one of a group that includes a second color component light of the generated display light or a third color component light of the generated display light.

10. The method of claim 9, wherein the first color component light of the generated display light comprises a green component light having a wavelength of between 495 nm and 570 nm.

11. The method of claim 8, further comprising providing an optical power via a surface grating of the outcoupler to converge the first component light of the generated display light at the first focal distance.

12. The method of claim 11, wherein providing the optical power includes configuring one or more physical parameters of the surface grating, the one or more physical parameters including at least one of a group that includes:
   an angle of one or more etched channels with respect to the surface grating;
   a depth of the etched channels; and
   a lateral spacing of the etched channels.

13. The method of claim 8, wherein modifying the virtual image comprises modifying the virtual image prior to generating the display light.

14. The method of claim 8, further comprising using one or more additional diffractive waveguides to converge the first component light at an additional distinct focal distance from the eye of the user.

* * * * *